(12) United States Patent
Liu et al.

(10) Patent No.: US 8,804,807 B2
(45) Date of Patent: Aug. 12, 2014

(54) ITERATIVE EQUALIZATION WITH NON-LINEAR SOFT INTERFERENCE CANCELLATION IN NON-LINEAR SATELLITE CHANNELS

(71) Applicant: Northrop Grumman Systems Corporation, Falls Church, VA (US)

(72) Inventors: Daniel N. Liu, Torrance, CA (US); Michael P. Fitz, Los Angeles, CA (US)

(73) Assignee: Northrup Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 13/758,817

(22) Filed: Feb. 4, 2013

(65) Prior Publication Data

US 2013/0336377 A1    Dec. 19, 2013

Related U.S. Application Data

(60) Provisional application No. 61/659,202, filed on Jun. 13, 2012.

(51) Int. Cl.
*H03H 7/30* (2006.01)
*H04L 27/01* (2006.01)
*H04L 25/03* (2006.01)

(52) U.S. Cl.
CPC ............ *H04L 27/01* (2013.01); *H04L 25/0328* (2013.01); *H04L 25/03171* (2013.01)
USPC ............................ 375/232; 375/233; 375/350

(58) Field of Classification Search
None
See application file for complete search history.

(56) References Cited

U.S. PATENT DOCUMENTS

| | | | |
|---|---|---|---|
| 3,974,448 A | 8/1976 | Baum | |
| 5,720,039 A | 2/1998 | Lieberman | |
| 6,501,805 B1 | 12/2002 | Twitchell | |
| 6,687,235 B1 | 2/2004 | Chu | |
| 6,798,843 B1 | 9/2004 | Wright | |
| 7,268,620 B2 | 9/2007 | Nygren | |
| 7,609,759 B2 | 10/2009 | Raz | |
| 7,773,692 B2 | 8/2010 | Copeland | |
| 7,822,146 B2 | 10/2010 | Copeland | |
| 8,605,819 B2* | 12/2013 | Lozhkin | 375/297 |
| 2004/0247061 A1* | 12/2004 | Matsumoto et al. | 375/346 |
| 2010/0194474 A1 | 8/2010 | Ishikawa | |
| 2011/0069749 A1 | 3/2011 | Forrester | |
| 2011/0080216 A1 | 4/2011 | Mujica | |
| 2012/0027070 A1 | 2/2012 | Beidas | |

(Continued)

OTHER PUBLICATIONS

Chen, Yen-Chih and Su, Yu Ted, "Turbo Equalization of Nonlinear TDMA Satellite Signals", IEICE Trans. Commun., vol. E92-B, No. 3, Mar. 2009, pp. 992-997.

(Continued)

*Primary Examiner* — Leon-Viet Nguyen
(74) *Attorney, Agent, or Firm* — John A. Miller; Miller IP Group, PLC

(57) ABSTRACT

A method for removing distortions in a transmitted signal transmitted by a high power amplifier in a satellite communications system. The method characterizes the high power amplifier to define a series of Volterra coefficients and uses those coefficients in an equalizer in a receiver in the communications system to remove the distortions. The equalizer is a non-linear soft interference cancellation and minimum mean square error equalizer that employs three processing operations including parallel soft interference cancellation, minimum mean square error filtering and a priori log-likelihood ratio calculations.

20 Claims, 2 Drawing Sheets

(56) References Cited

U.S. PATENT DOCUMENTS

| | | |
|---|---|---|
| 2012/0086504 A1 | 4/2012 | Tsukamoto |
| 2012/0098596 A1 | 4/2012 | Nagatani |
| 2012/0140860 A1 | 6/2012 | Rimini |
| 2012/0154039 A1 | 6/2012 | Brice |
| 2012/0154041 A1 | 6/2012 | Kim |
| 2013/0272367 A1* | 10/2013 | Beidas .......................... 375/232 |

OTHER PUBLICATIONS

Ampeliotis, D. et al., "Turbo Equalization of Non-Linear Satellite Channels using Soft Interference Cancellation", IEEE 2008, pp. 289-292.

Benedetto, Sergio- and Biglieri, Ezio; "Nonlinear Equalization of Digital Satellite Channels", IEEE Journal on Selected Areas in Communications, vol. SAC-1, No. 1, Jan. 1983, pp. 57-62.

Ogunfunmi, Tokunbo et al. "Equalization of Non-Linear Channels Using a Volterra-Based Non-Linear Adaptive Filter" IEEE 2011, 4 pgs.

Malone, Jerry et al. "Practical Volterra Equalizers for Wideband Satellite Communications with TWTA Nonlinearities" IEEE 2011, pp. 48-53.

Beidas, Bassel F. "Turbo Volterra Equalization of Intermodulation Distortion in Multicarrier Satellite Systems" The 2011 Military Communications Conference—Track 1—IEEE 2-11, pp. 358-363.

Liu, Daniel N. "MAP Equalization and Decoding in Wireless Mobile Coded OFDM" IEEE Transactions on Communications, vol. 57, No. 7, Jul. 7, 2009, pp. 2042-2051.

Frank, Walter et al. "Efficient Equalization of Nonlinear Communication Channels" IEEE 1997, pp. 2501-2504.

Gutierrez, Alberto et al. "Performance of Adaptive Volterra Equalizers on Nonlinear Satellite Channels" IEEE 1995, pp. 488-492.

* cited by examiner

ITERATIVE EQUALIZATION WITH NON-LINEAR SOFT INTERFERENCE CANCELLATION IN NON-LINEAR SATELLITE CHANNELS

CROSS-REFERENCE TO RELATED APPLICATIONS

This application claims the benefit of the filing date of provisional application Ser. No. 61/659,202 titled, Iterative Equalization with Non-Linear Soft Interference Cancellation in Non-Linear Satellite Channels, filed Jun. 13, 2012.

BACKGROUND

1. Field

This invention relates generally to a satellite communications system employing iterative equalization to improve system performance and, more particularly, to a satellite communications system that employs iterative equalization to improve system performance in a system receiver by employing a small number of Volterra series coefficients in a non-linear soft interference cancellation (SIC) and minimum mean square error (MMSE) equalizer.

2. Discussion of the Art

Satellite communications is seeing a growing demand for greater throughput and transponders with more DC power efficiency. To provide greater spectral efficiency, satellite communications systems often employ modern coding and modulation, best exemplified by the DVB-S2 standard. To meet the radiated power demands necessary for the signal transmission distances, satellite communications systems employ high power amplifiers (HPAs), such as traveling-wave tube amplifiers (TVVTAs) and solid-state power amplifiers (SSPA). To provide high throughput and increased efficiency, these HPAs often operate at or near their saturation level, which often results in severe non-linear distortions of the transmitted signal that has a reverse effect on the throughput and performance of the communications channel. Thus, a satellite communications channel provides significantly different design challenges from traditional terrestrial channels due to its dominant non-linear behavior.

It has been shown in the satellite communications art that by applying the concept of "Turbo Processing," a practical decoding strategy in the system receiver can perform iterative processing between a soft-input/soft-output (SISO) equalizer and an outer channel decoder. For example, a maximum-likelihood sequence detection (MLSD) receiver has been proposed that models a non-linear satellite channel as a finite-state machine (FSM), where the complexity of the model grows exponentially with data throughput. Approximate MLSD receiver structures have been investigated in the art, but the receiver complexity is still $O(2^{M_cL})$, where $M_c$ denotes the number of bits per coded symbol and L is the length of the channel memory.

Volterra series decomposition is a known mathematical model for modeling non-linear behavior and provides an efficient and analytically tractable way to represent a non-linear satellite communications channel. Generally, a Volterra series is an infinite polynomial description of a signal. Practical non-linear equalization utilizing a Volterra series representation has been investigated in the satellite communications art, where the non-linear equalizer is constructed in a noiseless environment and in an uncoded situation. Despite showing improvement by non-linearly combining channel observations according to dominant Volterra series coefficients, the non-linear equalizers employing Volterra coefficients proposed in the art suffer significant performance degradation due to noise enhancement in the low signal-to-noise ratio (SNR) regime.

Other practical equalizer/detector structures have been proposed in the satellite communications art to correct non-linear distortions in satellite communications signals including a symbol-by-symbol non-linear de-mapper that models the non-linear satellite communications channel into an effective non-linear inter-symbol interference (ISI) channel. Because this approach is limited by the model accuracy, it suffers extra performance degradation with a strong non-linearity.

Another equalizer has been proposed in the satellite communications art to correct non-linear distortions in satellite communications signals that includes a set of parallel interference cancellation filters for each term in the Volterra series. However, this approach is computationally inefficient both due to the interference cancelling structure and because it uses all the terms in the Volterra series model.

A non-linear complexity SISO detector/equalizer has also been proposed in the satellite communications art to correct non-linear distortions in satellite communications signals based on a heuristic reduced $3^{rd}$ order Volterra series model, where the reduction of the Volterra series model is independent of the actual non-linear device. This characteristic is undesirable as the terms that most impact performance in the Volterra model are device dependent.

DETAILED DESCRIPTION OF THE EMBODIMENTS

The following discussion of the embodiments of the invention directed to an SIC-MMSE equalizer for correcting non-linear distortions in satellite communications signals is merely exemplary in nature, and is in no way intended to limit the invention or its applications or uses. For example, as discussed herein, the invention has particular application for correcting non-linear distortions in satellite signals transmitted using high power amplifiers. However, as will be appreciated by those skilled in the art, the invention will have application for any type of communications signal that includes non-linear distortions, including signals transmitted using high power amplifiers that are not satellite communications signals.

The present invention proposes a low complexity iterative SIC-MMSE equalizer in a receiver for correcting non-linear distortions in satellite communications signals that employs a small number of dominate terms in a Volterra series representation of the signal. Since the focus is on bandwidth efficient modulation (BEM), algorithms that can accommodate constellations having multiple amplitudes have been addressed. The key idea captured by the algorithm is that only a few symbols cause significant interference, which allows the complexity of soft cancellation and equalization to remain small. Good bit error performance can then be achieved by iteration between the equalizer and the decoder.

Figure 1:
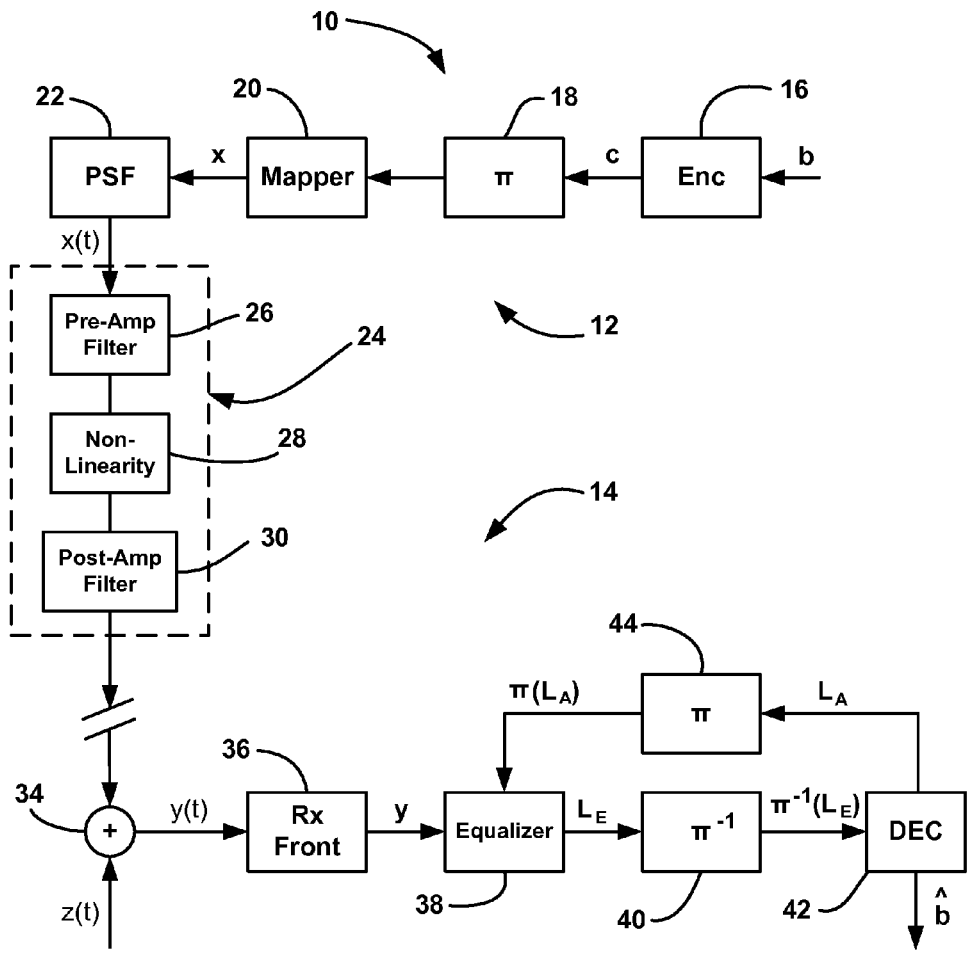
FIG. 1 is a block diagram of a satellite communications system.

The present invention can be used in connection with a single-input, single-output point-to-point coded communications system over a non-linear satellite channel such as satellite communications system 10 shown in FIG. 1. The satellite communications system 10 includes a transmitter 12 and a receiver 14, where the transmitter 12 and the receiver 14 can be either on the satellite or on a ground station. The transmitter 12 includes an encoder 16 that receives a digital signal b having bits to be transmitted, where the encoder 16 encodes the signal b depending on the particular architecture being employed and generates a coded bit sequence signal $c=[c_1 \ldots c_{KM_c}]^T$. The coded signal c from the encoder 16 is sent to an interleaver 18 that redistributes the sequence of bits in the coded bit sequence signal c to increase the performance of the transmitter 12 by reducing the chance that bursty errors do not corrupt a group of bits that would exceed the systems error correction coding capability.

The interleaved signal from the interleaver 18 is then sent to a mapper 20 that translates the interleaved bits into a series of symbols as an Euclidean distance in a manner well understood by those skilled in the art. For example, the mapper 20 may employ quadrature phase shift keying (QPSK) that provides in-phase and quadrature-phase bits for each symbol that is transmitted. In this example, the coded bit sequence signal $c=[c_1 \ c_{KM_c}]^T$ is mapped into a block of K coded symbols x that generates a set of K-coded information symbols $x=[x(1) \ldots x(K)]^T$ that are provided to a pulse-shaping filter (PSF) 22. It is assumed that the symbols are equally likely chosen from a complex constellation X with cardinality $|X|=2^{M_c}$, and that have an average symbol energy $E_x \equiv E|x(k)|^2$. The output signal from the PSF 22 is a time domain waveform x(t) given by:

$$x(t) = \sum_{k=0}^{K} x(k)g(t-kT), \quad (1)$$

where g(•) represents the impulse response of the PSF 22 and T is the symbol duration.

The output signal x(t) from the PSF 22 is sent to an HPA 24 on the transmitter 12 for transmission. The HPA 24 includes a pre-amplifier filter 26 that filters the signal x(t) and provides the filtered signal to a memoryless non-linearity amplifier 28 for amplification. The amplified signal is then filtered by a post-amplifier filter 30 before it is transmitted by the transmitter 12 from the satellite or the ground station as a discrete-input/discrete-output symbol sequence signal y(n).

The receiver 14 receives the symbol sequence signal y(n) from the HPA 24 at the ground station, or otherwise, which can be described as:

$$y(n) = \sum_{v=1}^{\infty} \sum_{n_1} \ldots \sum_{n_{2v-1}} h_{n_1 \ldots n_{2v-1}}^{(2v-1)} x(n-n_1)x(n-n_2) \ldots x(n-n_v) \quad (2)$$

$x(n-nv+1)\dagger \ldots xn-n2v-1\dagger+zn = n1hn11xn-n1+n1n2n3hn1n2n33xn-n1xn-n2xn-n3\dagger+ \ldots +zn,$ where $h_{n_1 \ldots n_{2v-1}}^{(2v-1)}$ are Volterra series coefficients and z(n) is additive white Gaussian noise (AWGN). The AWGN is added to the received signal y(n) at a summation junction 34 to provide modeling for thermal background noise.

Equation (2) shows that the received signal y(n) depends both on the channel response and the input symbols. The Volterra coefficients $h_{n_1 \ldots n_{2v-1}}^{(2v-1)}$, which depend on the channel model, provide the relative weighting given to the non-linear combinations of the input symbols in the overall channel response. Due to the band limited nature of the satellite communications channel, only odd-order Volterra coefficients are required. Moreover, equation (2) represents a generic Volterra series model, and as such, it is proposed to adaptively reduce the model based on the specific characteristics of the HPA 24.

As will be discussed in detail below, the present invention models the HPA 24 as a bandpass non-linearity in the receiver 14. The signal y(t) is provided to a receiver front-end 36 where the analog signal y(t) is down-converted, the carrier signal is removed and the signal is converted to a digital signal y in a manner that is well understood by those skilled in the art. The digital signal y from the receiver front-end 36 is provided to an inner SIC-MMSE equalizer 38 operating as a type of SISO equalizer that removes non-linear distortions from the signal y as will be discussed in detail below. The equalizer 38 calculates an a posteriori log-likelihood ratio (LLR) $L_D$ for each bit, separates a priori LLR information $L_A$ fed back from an outer channel decoder 42 and provides extrinsic LLR information $L_E$ to an inverse interleaver 40 that removes the bit interleaving provided by the interleaver 18 in the transmitter 12. The inverse interleaver 40 provides a deinterleaved signal $\pi^{-1}(L_E)$ to the outer channel decoder 42 that generates a decoded digital signal $\hat{b}$. The outer channel decoder 42 provides the a priori LLR $L_A$ to an interleaver 44 that provides the same interleaving as the interleaver 18 to provide an interleaved signal $\pi(L_A)$ to the equalizer 38 for feedback purposes. Thus, the equalizer 38 subtracts the a priori LLR $L_A$ that is known by the decoder 42 from the a posteriori LLR $L_D$ to generate the LLR $L_E$ that is unknown by the decoder 42.

Approaching maximum-likelihood (ML) performance with reasonable complexity relies on iterative processing between equalization and decoding. Analogous to a turbo decoder, the inner equalizer 38 and the outer channel decoder 42 can be regarded as two elementary "decoders" in a serial concatenated architecture. The equalizer 38 uses the channel observation signal y and the a priori LLR $L_A(c_l)$ to compute the extrinsic information LLR $L_E(c_l)$ for each of the $KM_c$ bits per received signal y. With $c_l=+1$ representing a binary one and $c_l=-1$ representing a binary zero, the LLR $L_A(c_l)$ from the outer channel decoder 42 is defined as:

$$L_A(c_l) \equiv \ln \frac{P[c_l = +1]}{P[c_l = -1]}, \quad (3)$$

where $l=1, \ldots, KM_c$.

The a posteriori LLR $L_D(c_l|y)$ for bit $c_l$, conditioned on the received signal y, is similarly defined as:

$$L_D(c_l|y) \equiv \ln \frac{P[c_l = +1 | y]}{P[c_l = -1 | y]}, \quad (4)$$

where $P[c_l=\pm 1]$ is the a posteriori probability (APP) of the bit $c_l$.

The "new" a priori extrinsic information LLR $L_E$ learned at the equalizer 38 can easily be separated from the a posteriori LLR $L_D(c_l)$ by subtracting the a priori LLR $L_A(c_l)$ as:

$$L_E(c_l)=L_D(c_l|y)-L_A(c_l). \quad (5)$$

The extrinsic information LLR $L_E(c_l)$ is then fed into the outer channel decoder 42 as a priori information on the coded bit $c_l$.

The structure of equation (2) details an infinite Volterra series. This invention uses a third-order Volterra series model (v=2) to provide the equalization. Depending on the channel memory length N, the number of total coefficients including both linear and non-linear terms can be up to $N+N^3$ terms. The Volterra series model that will be used in the equalizer 38 needs to be identified. Thus, the characteristics of the HPA 24 need to be determined and the set of Volterra coefficients need to be defined for those characteristics before the equalizer 38 is built.

Figure 2:
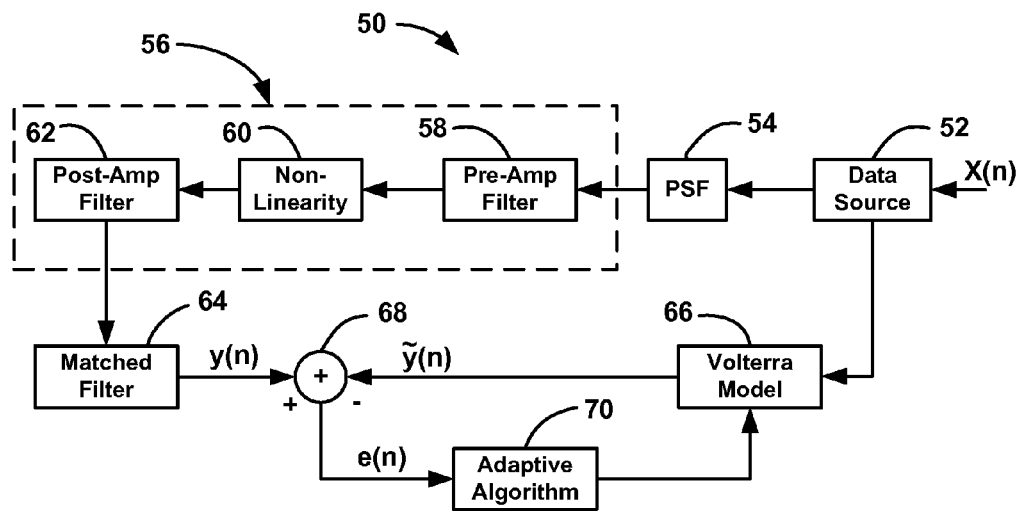
FIG. 2 is a block diagram of a system identification architecture for identifying system characteristics in a non-linear satellite communications channel.

FIG. 2 is a block diagram of a system identification architecture 50 for a non-linear satellite communications channel that shows how the set of Volterra coefficients can be determined by defining the non-linear characteristics of the HPA 24. The architecture 50 includes a data source 52 that provides the symbol signal x to a PSF 54, representing the PSF 22, which provides the analog time domain signal x(t) discussed above to an HPA 56 including a pre-amplifier filter 58, a non-linearity filter 60 and post-amplifier filter 62. The amplified signal is provided to a matched filter 64 that reproduces the transmission path of the signal and that generates the representative transmitted signal y(n) in the receiver 14, as discussed above. The symbol signal x from the data source 52 is also provided to a Volterra model 66 that uses estimated Volterra series coefficients to determine an estimated signal $\tilde{y}(n)$. The estimated signal $\tilde{y}(n)$ is subtracted from the received signal y(n) at a summing junction 68 and an error e(n) therebetween is provided to an adaptive algorithm 70 that adjusts the Volterra coefficients in the Volterra model 66. The adjusted Volterra coefficients provide a correction to the estimated signal $\tilde{y}(n)$ that should be closer to the received signal y(n) that will cause the error e(n) to be reduced. Once the adaptive algorithm modifies the Volterra coefficients so that the estimated signal $\tilde{y}(n)$ is about the same as the received signal y(n) and the error e(n) is minimized, then those Volterra coefficients are provided in the equalizer 38 when it is built.

The number of surviving non-linear Volterra series coefficients depends both on the modulation format and the desired system identification error tolerance. The constant envelop modulation formats, such as M-ary PSK and MSK, reduce some non-linear terms to linear ones, for example, since $x(n)x(n)x^\dagger = |x(n)|^2$ is a constant that is independent of the actual data symbol. The architecture 50 can characterize the relative error produced by each Volterra series term.

It is possible to reduce the model complexity even further by comparing the RMS error produced in the Volterra modeling for each term of the series to a threshold. Terms are included in the adaptive algorithm 70 only if the error exceeds the threshold. The number of terms that results from such a pruning would be variable and would depend on the modulation and the HPA model. Since the number of terms selected out of the $N+N^3$ terms of the Volterra series is determined by the threshold value there exists a direct trade-off between complexity of the model and modeling error.

For a typical TWTA model, the Volterra coefficient identification and model reduction can be performed. For a threshold value of $5 \times 10^{-3}$:

$$y(n) = \sum_{n_1=0}^{N-1} h_{n_1}^{(1)} x(n-n_1) + h_{133}^{(3)}|x(n-3)|^2 x(n-1) + \quad (6)$$

$h_{222}^{(3)}|x(n-2)|^2 x(n-2 + h2233xn - 22xn - 3\dagger +$ $h2323xn - 22xn - 3 + h2333xn - 32xn - 2 +$ $h3323xn - 32xn - 2\dagger + h3333xn - 32xn - 3 + wn,$ which best represents a TWTA operated near saturation, where $h_{n_1}^{(1)}$ represents the linear channel Volterra coefficients and $h_{n_1 n_2 n_3}^{(3)}$ represents the third-order non-linear Volterra coefficients, which are shown in Table I below.

TABLE I

| Linear Part | |
|---|---|
| $h_0^{(1)} = 0.0074 - 0.0046j$ | $h_2^{(1)} = 0.1603 - 0.0634j$ |
| $h_1^{(1)} = -0.0429 + 0.0151j$ | $h_3^{(1)} = 0.3445 - 01226j$ |
| $3^{rd}$ Order Nonlinearities | |
| $h_{133}^{(3)} = -0.0066 - 0.0006j$ | $h_{233}^{(3)} = -0.0237 + 0.0008j$ |
| $h_{222}^{(3)} = 0.0148 - 0.0019j$ | $h_{332}^{(3)} = -0.0087 + 0.0006j$ |
| $h_{223}^{(3)} = -0.0066 + 0.0010j$ | $h_{333}^{(3)} = -0.0108 + 0.0010j$ |
| $h_{232}^{(3)} = -0.0177 + 0.0016j$ | |

By collecting the channel observation signal y(n) into y as $y=[y(n),y(n-1), \ldots, y(n-L+1)]^T$, equation (6) can be rewritten in a more compact form as:

$$y = H_0^{(1)} x_0 + \sum_{i=1}^{7} H_i^{(3)} x_i + z, \quad (7)$$

where $x_0 = [x(n), x(n-1), \ldots, x(n-N-L+2)]^T$ represents the information symbol sequence in linear form, $H_0^{(1)} \in C^{L \times (N+L-1)}$ is the traditional convolution matrix with Toeplitz structure, $H_i^{(3)} \in C^{L \times N} \forall i=1 \ldots 7$ represents the non-linear Volterra convolution matrices, and $x_i \in C^{N \times 1}$ collects the corresponding non-linear terms in vector form. More specifically:

$$x_1 = [|x(n-3)|^2 x(n-1), \ldots, |x(n-N-2)|^2 x(n-N)]^T, \quad (8)$$

$$x_2 = [|x(n-2)|^2 x(n-2), \ldots, |x(n-N-1)|^2 x(n-N-1)]^T, \quad (9)$$

$$x_3 = [x(n-2)^2 x(n-3), \ldots, x(n-N-1)^2 x(n-N-2)]^T, \quad (10)$$

$$x_4 = [|x(n-2)|^2 x(n-3), \ldots, |x(n-N-1)|^2 x(n-N-2)]^T, \quad (11)$$

$$x_5 = [|x(n-3)|^2 x(n-2), \ldots, |x(n-N-2)|^2 x(n-N-2)]^T, \quad (12)$$

$$x_6 = [x(n-3)^2 x(n-2), \ldots, x(n-N-2)^2 x(n-N-2)]^T, \quad (13)$$

$$x_7 = [|x(n-3)|^2 x(n-3), \ldots, |x(n-N-2)|^2 x(n-N-2)]^T, \quad (14)$$

The value $H_0^{(1)}(m) \in C^{L \times 1}$ is denoted as the $m^{th}$ column of linear channel matrix $H_0^{(1)}$, where $m=0, \ldots, N+L-2$. Likewise, $H_i^{(3)}(j) \in C^{L \times 1}$ denotes the $j^{th}$ column of the non-linear Volterra coefficient matrices $H_i^{(3)}$ with $j=0, \ldots, N-1$. Since BEM is the subject of interest, there is a limited ability to simplify the computation of the non-linear terms because the modulations have multiple amplitudes. Also, since turbo equalization is being examined, the feedback from the decoder 42 can be used to reduce the model complexity. For example, if it becomes highly likely that the symbol x(n-2) lies on the same ring in a multi-ring constellation as suggested, then the term $|x(n-2)|^2$ can be considered as a constant.

Figure 3:
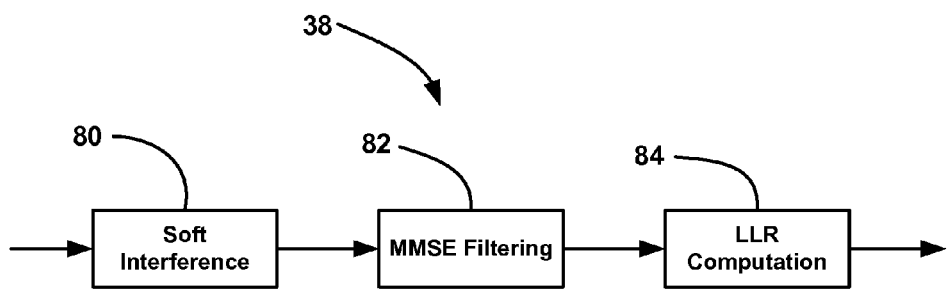
FIG. 3 is a block diagram of the equalizer shown in the satellite communications system of FIG. 1.

The SIC-MMSE equalizer 38 employs three stages of signal processing to generate the LLR $L_D$ in the manner discussed above, namely, parallel soft interference cancellation, MMSE filtering and LLR computation. FIG. 3 is a block diagram of the equalizer 38 and includes a non-linear parallel soft interference cancellation (SIC) processor 80, an MMSE linear filter 82 and an LLR computation processor 84.

The processor 80 cancels both linear and non-linear interference for each symbol of interest in the signal y(n) using a priori symbol information feedback from the error control decoder 42. Let x(n−m) be the symbol for which the equalizer 38 is computing the LLRs to update the decoder 42. The cancellation processor 80 subtracts the interference from equation (7) by:

$$\tilde{y} = y - \sum_{k=0, k \neq m}^{N+L-2} h_0^{(1)}(k) \bar{x}(n-k) - \sum_{i=1}^{7} \sum_{j \in \mathcal{A}_i} h_i^{(3)}(j) \bar{x}_i(j), \quad (15)$$

where $\bar{x}(n-k)$ is the symbol mean calculated from a priori information, $\bar{x}_i(j)$ represents the $j^{th}$ element in the $i^{th}$ non-linear symbol mean vector $\bar{x}_i$, and $A_i$ is a set of indices that indicate which terms $x_i$ are a function of x(n−m).

Equation (15) implies that the processing to produce the signal $\tilde{y}$ is an attempt to cancel all of the interference terms that are not a function of x(n−m). The symbol mean $\bar{x}(n-k)$ can be computed as:

$$\bar{x}(n-k) = \sum_{x \in \chi} x P[x(n-k) = x], \quad (16)$$

where P[x(n−k)=x] is the a priori symbol probability computed using a priori information feedback from the outer channel decoder 42.

In general, the non-linear symbol mean vector $\bar{x}_i$ can be constructed accordingly. For the example where i=2 and m=3, $A_2$=[1] and:

$$\bar{x}_2 = \left[ \sum_{x \in \chi} |x(n-2)|^2 x(n-2) P[x(n-2) = x], 0, \right. \quad (17)$$

$$\left. \ldots, \sum_{x \in \chi} |x(n-N-1)|^2 x(n-N-1 P x n - N - 1 = xT. \right.$$

Simply put, $A_2$=[1] indicates that $x_2$(j=1)=|x(n−32xn−3 is a useful non-linear symbol term that contributes to the detection of the symbol of interest x(n−3). Realizing the fact that non-linear terms like |x(n−22 can be considered a constant, the SIC processor 80 further simplifies the computation of the vector $\bar{x}_2$ as:

$$\bar{x}_2 = [|\bar{x}(n-2)|^2 \bar{x}(n-2), 0, \ldots, |\bar{x}(n-N-1)|^2 \bar{x}(n-N-1)]^T, \quad (18)$$

where equation (18) can significantly reduce the complexity by reusing the mean computed for the linear terms in equation (16).

It is helpful to further define $H_0^{(1)}(m) \in C^{L \times (N+L-1)}$ as:

$$H_0^{(1)}(m) = [h_0^{(1)}(0), \ldots, h_0^{(1)}(m), \ldots, h_0^{(1)}(N+L-2)]. \quad (19)$$

The linear filter 82 then filters the signal y having the linear and non-linear interference removed in an optimal manner using a minimum mean square error (MMSE) filter. Given the observation model in equations (7) and (15), the MMSE linear filter 82 can be succinctly described in the optimization problem of equation (20). By solving the optimization problem of equation (20), a set of coefficients are defined, as discussed in detail below, that provide a series of filter taps that are used to filter the signal y.

$$\text{minimize } E|x(n-m) - \hat{x}(n-m)|^2 \text{ subject to } \hat{x}(n-m) = w_m^\dagger \tilde{y}. \quad (20)$$

The optimal MMSE equalizer coefficient $W_m$ is calculated by solving equation (20) and is given by:

$$W_m = \left( \frac{N_0}{E_x} I_L + H_0^{(1)}(m) \Delta^{(1)}(m) H_0^{(1)}(m)^\dagger + \right. \quad (21)$$

$$\left. \sum_{i=1}^{7} \left( H_0^{(1)}(m) \Delta_i^{(1,3)} H_i^{(3)\dagger} + H_i^{(3)} \Delta_i^{(3,1)} H_0^{(1)}(m)^\dagger \right) + i = \right.$$

$$17b = 17Hi3\Delta i, b3Hb3\dagger - 1h01m + i = 17j \in \mathcal{A}1hi3j,$$

where the linear covariance matrix $\Delta^{(1)}(m)$ is:

$$\Delta_m^{(1)} = \text{diag}\left[ \frac{\sigma_0^2}{E_x}, \ldots, \frac{\sigma_{m-1}^2}{E_x}, 1, \frac{\sigma_{m+1}^2}{E_x}, \ldots, \frac{\sigma_{N+L-2}^2}{E_x} \right], \quad (22)$$

and $\sigma_k^2$, k=0, 1, …, N+L−2 with k≠m is the transmit symbol variance and generally can be computed as:

$$\sigma_k^2 = \sum_{x \in \chi} |x - \bar{x}(n-k)|^2 P[x(n-k) = x]. \quad (23)$$

Moreover, the linear-non-linear cross covariance matrix $\Delta_i^{(1,3)} \in C^{(N+L-1) \times N}$ can be computed as:

$$\Delta_i^{(1,3)} = E[(x_0 - \bar{x}_0)(x_i - \bar{x}_i)^\dagger] \forall i=1, \ldots, 7, \quad (24)$$

where $\bar{x}_0$ collects the "estimated" symbol mean excluding the $m^{th}$ symbol of interest as:

$$\bar{x}_0 = [\bar{x}(n), \ldots, 0, \ldots, \bar{x}(n-N-L+2)], \quad (25)$$

and $\bar{x}_i$ collects the "interfering" non-linear symbol term except the terms denoted by $A_i$.

It is straightforward to show that $\Delta_i^{(1,3)} \equiv \Delta_i^{(1,3)\dagger}$ by definition. Likewise, the non-linear covariance matrix $\Delta_{i,b}^{(3)} \in C^{N \times N}$ can be computed as:

$$\Delta_{i,b}^{(3)} = E[(x_i - \bar{x}_i)(x_b - \bar{x}_b)^\dagger] \forall i,b=1, \ldots, 7. \quad (26)$$

Computation of equation (26) is simplified in a similar manner as that shown in equation (16).

The LLR processor 84 computes the coded a posteriori bit LLRs from the output of the MMSE linear filter 82 to provide the LLR $L_D$. Calculating the a posteriori LLR from the output of a non-linear SIC equalizer of $\hat{x}(n-m) = w_m^\dagger \tilde{y}$ relies on the Gaussian approximation of the residual ISI-plus noise. Thus, the output of the SIC-MMSE equalizer 38 can be written as:

$$w_m^\dagger \left( h_0^{(1)}(m) x(n-m) + \sum_{i=1}^{7} \sum_{j \in \mathcal{A}_1} h_i^{(3)}(j) \bar{x}_i(j) \right) + \quad (27)$$

$$w_m^\dagger \left( \sum_{k=0, k \neq m}^{N+L-2} h_0^{(1)}(k) x(n-k) + \sum_{i=1}^{7} \sum_{j \in \mathcal{A}_i} h_i^{(3)}(j) \bar{x}_i(j) \right) +$$

$$w_m^\dagger z = \mu_m x(n-m) + \tilde{z}_m,$$

where:

$$\mu_m = w_m^\dagger \left( h_0^{(1)}(m) + \sum_{i=1}^{7} \sum_{j \in \mathcal{A}_i} \tilde{h}_i^{(3)}(j) \right), \quad (28)$$

and $\tilde{z}_m$ is considered a residual ISI-plus-noise term and $\tilde{h}_i^{(3)}(j)$ is the $i^{th}$ non-linear Volterra coefficient scaled by some constant.

The processor 84 approximates the output as having a complex Gaussian distribution given x(n–m), specifically:

$$P[\hat{x}(n-m) \mid x(n-m) = x] \sim \mathcal{N}_c(\mu_m x, \eta_m^2) = \frac{1}{\pi \eta_m^2} e^{-\frac{1}{\eta_m^2}|\hat{x}(n-m)-\mu_m x|^2}, \quad (29)$$

where x∈X and the conditional variance is given by:

$$\eta_m^2 = (\mu_m - \mu_m^2) E_x. \quad (30)$$

The a posteriori LLR $L_D(c_l|\hat{x}(n-m))$ is computed for each symbol estimate by:

$$L_D(c_l \mid \hat{x}(n-m)) = \log \frac{\sum_{x \in X_l^{+1}} P[\hat{x}(n-m) \mid x(n-m) = x] P[x(n-m) = x]}{\sum_{x \in X_l^{-1}} P[\hat{x}(n-m) \mid x(n-m) = x] P[x(n-m) = x]}, \quad (31)$$

where $X_l^{+1}$ is the set of $2^{M_c}$ constellation symbols x, and where the $l^{th}$ bit is +1.

Using the feedback signal $L_A$ from the decoder 42, the processor 84 calculates the extrinsic information $L_E(c_l)$ for each bit as:

$$L_E(c_l) = L_D(c_l|\hat{x}(n-m)) - L_A(c_l) \quad (32)$$

A detailed computer simulation has been performed to show the performance of the proposed non-linear SIC-MMSE equalizer 38 in a practical satellite communications system. Most of the physical layer parameters, such as modulation formats, code block length, code type and framing structure, were in accordance with the ETSI DVB-S2 standard. Perfect timing and synchronization, no clock/carrier frequency offset and a standard full message passing LDPC decoder were assumed.

A 16APSK constellation with ring ratio of 2.85 was assumed. In particular, a Rate-3/4 outer LDPC code with overall spectral efficiency of 2.99 bits per channel use was used. Unlike previously reported results in the literature, multi-ring APSK structure fundamentally dictates the form and number of surviving non-linear Volterra coefficients as discussed above. Being able to take full advantage of the turbo equalization structure and a priori LLR information fed back from the outer channel decoder 42, the non-linear SIC MMSE equalizer 38 effectively transforms the potential non-linear "interfering" terms into a useful detection signal.

As discussed above, a high performing and computational efficient non-linear satellite communication system is proposed. By taking advantage of a turbo equalization structure and a priori information feedback from an outer channel decoder, the non-linear SIC-MMSE equalizer 38 achieves a better performance compared to its linear counterpart while simultaneously being much more computational efficient.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for removing distortions in an actual transmitted signal transmitted by a high power amplifier, said actual transmitted signal including bits, said method comprising:
    providing a model of the high power amplifier that generates a reproduced transmitted signal of the actual transmitted signal;
    defining a series of Volterra coefficients from the reproduced transmitted signal using a Volterra model;
    receiving the actual transmitted signal in a receiver; and
    processing the actual transmitted signal in an equalizer in the receiver to generate a digital signal including the bits, wherein processing the actual transmitted signal in the equalizer includes providing parallel soft interference cancellation of the actual transmitted signal that cancels both linear and non-linear interference for each symbol of interest in the actual transmitted signal, filtering the actual transmitted signal after the parallel soft interference cancellation using a minimum mean square error filter that employs the Volterra coefficients to provide equalizer coefficients, and using the equalizer coefficients to generate a new extrinsic log-likelihood ratio (LLR) of the bits in the actual transmitted signal.

2. The method according to claim 1 wherein processing the actual transmitted signal in an equalizer includes providing the new extrinsic LLR of the bits to an outer channel decoder that decodes the bits.

3. The method according to claim 2 wherein the outer channel decoder provides an a priori LLR of the bits as a feedback signal to the equalizer.

4. The method according to claim 3 wherein providing parallel soft interference cancellation of the actual transmitted signal includes using the a priori LLR of the bits and a symbol mean to subtract the interference.

5. The method according to claim 2 wherein using the equalizer coefficients to generate a new extrinsic LLR of the bits includes generating an a posteriori LLR of the bits using the equalizer coefficients and subtracting the a priori LLR of the bits from the a posteriori LLR of the bits to generate the new extrinsic LLR of the bits.

6. The method according to claim 1 wherein filtering the actual transmitted signal after signal cancellation in the equalizer includes solving an optimization problem that identifies a series of filter taps.

7. The method according to claim 1 wherein using the equalizer coefficients to generate the new extrinsic LLR includes employing a Gaussian approximation of inter-symbol interference plus noise.

8. The method according to claim 1 wherein the high power amplifier is a traveling-wave tube amplifier or a solid-state power amplifier.

9. The method according to claim 1 wherein the actual transmitted signal is a satellite signal.

10. A method for removing distortions from a transmitted signal received by a receiver using an equalizer in the receiver, said transmitted signal including bits, said method comprising:

receiving an a priori log-likelihood ratio (LLR) of the bits in the equalizer;

providing parallel soft interference cancellation of the transmitted signal that cancels both linear and non-linear interference for each symbol of interest in the transmitted signal using the a priori LLR of the bits;

filtering the transmitted signal after the soft interference cancellation using a minimum mean square error filter that employs a series of Volterra coefficients provided by a Volterra model to generate equalizer coefficients;

generating an a posteriori LLR of the bits in the transmitted signal using the equalizer coefficients; and subtracting the a priori LLR of the bits from the a posteriori LLR of the bits to generate a new extrinsic LLR of the bits.

11. The method according to claim 10 wherein providing parallel soft interference cancellation of the transmitted signal includes using the a priori LLR of the bits and a symbol mean to subtract the interference.

12. The method according to claim 10 wherein filtering the transmitted signal after soft interference cancellation in the equalizer includes solving an optimization problem that identifies a series of filter taps.

13. The method according to claim 10 wherein using the equalizer coefficients to generate an a priori LLR includes employing a Gaussian approximation of inter-symbol interference plus noise.

14. The method according to claim 10 wherein receiving an a priori LLR of the bits in the equalizer includes receiving the a priori LLR of the bits from an outer channel decoder.

15. The method according to claim 10 wherein the transmitted signal is transmitted from a traveling-wave tube amplifier or a solid-state power amplifier.

16. The method according to claim 10 wherein the transmitted signal is a satellite signal.

17. A receiver receiving a transmitted signal from a high power amplifier, said transmitted signal including bits, said receiver comprising:

an outer channel decoder decoding the bits in the transmitted signal and providing an a priori log-likelihood ratio (LLR) of the bits; and an equalizer receiving the transmitted signal, said equalizer including a parallel soft interference cancellation processor that cancels both linear and non-linear interference for each symbol of interest in the transmitted signal using the a priori LLR of the bits, said equalizer further including a minimum mean square error filter that receives the transmitted signal from the parallel soft interference cancellation processor and filters the transmitted signal using Volterra coefficients to provide equalizer coefficients, said equalizer further including an LLR processor that generates an a posteriori LLR of the bits in the transmitted signal using the equalizer coefficients and generates an extrinsic LLR of the bits by subtracting the a priori LLR of the bits from the a posteriori LLR of the bits.

18. The receiver according to claim 17 wherein the parallel soft interference cancellation processor uses the a priori LLR of the bits and a symbol mean to subtract the interference.

19. The receiver according to claim 17 wherein the minimum mean square error filter solves an optimization problem that identifies a series of filter taps.

20. The receiver according to claim 17 wherein the LLR processor employs a Gaussian approximation of inter-symbol interference plus noise to generate the a priori LLR.

* * * * *